United States Patent
You et al.

(10) Patent No.: US 11,582,605 B2
(45) Date of Patent: Feb. 14, 2023

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Kyungjin You, Anyang-si (KR); Nahyeon Pak, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 248 days.

(21) Appl. No.: 17/022,223

(22) Filed: Sep. 16, 2020

(65) Prior Publication Data

US 2021/0377731 A1 Dec. 2, 2021

(30) Foreign Application Priority Data

May 28, 2020 (KR) .................. 10-2020-0064501

(51) Int. Cl.
*H04W 12/06* (2021.01)
*H04W 4/029* (2018.01)
(Continued)

(52) U.S. Cl.
CPC ........... *H04W 12/06* (2013.01); *H04W 4/029* (2018.02); *H04W 4/12* (2013.01); *H04W 12/71* (2021.01)

(58) Field of Classification Search
CPC ....... H04W 12/71; H04W 4/029; H04W 4/12; H04W 12/06; H04W 12/61; H04L 63/0838; H04L 63/0861; H04L 63/083
See application file for complete search history.

(56) References Cited

U.S. PATENT DOCUMENTS 8,195,234 B2 6/2012 Chang et al.
10,800,378 B1* 10/2020 Drayna ................. G06F 21/554
(Continued)

FOREIGN PATENT DOCUMENTS

JP 2005-122675 A 5/2005
JP 2015-113686 A 6/2015
(Continued)

OTHER PUBLICATIONS

"Supporting Personal Mobility with Integrated RFID in VoIP Systems1"; Pen-ho Chang and Tsan-Pin Wang Department of Computer and Information Science, National Taichung University, 140 Min-Sheng Rd., Taichung 403, Taiwan; 2009 International Conference on New Trends in Information and Service Science; 2009, pp. 1-7.*

*Primary Examiner* — Mohammad A Siddiqi
(74) *Attorney, Agent, or Firm* — Morgan, Lewis & Bockius LLP

(57) ABSTRACT

A personal mobility sharing system includes: a personal mobility, a server, an owner terminal and a member terminal connected through a network, and the server is configured to register a device information of the personal mobility, receive a sharing setting information from the owner terminal, set a sharing mode of the personal mobility based on the sharing setting information, receive an authentication request from the member terminal and transmit an unlock signal to the personal mobility when the authentication request includes pre-registered authentication information.

18 Claims, 12 Drawing Sheets

(51) Int. Cl.
*H04W 4/12* (2009.01)
*H04W 12/00* (2021.01)
*H04W 12/71* (2021.01)

(56) References Cited

U.S. PATENT DOCUMENTS

2013/0318159 A1* 11/2013 Earnshaw .......... H04N 1/00347
709/204
2017/0353845 A1* 12/2017 Jeong ................ H04M 1/72412
2020/0267253 A1* 8/2020 Grunfeld ................ H04M 1/04
2022/0111747 A1* 4/2022 Goei ....................... B60L 53/67

FOREIGN PATENT DOCUMENTS

| KR | 10-2018-0105044 A | 9/2018 |
| KR | 10-1930888 A | 12/2018 |
| KR | 10-2019-0060465 A | 6/2019 |
| KR | 10-2019-0073956 A | 6/2019 |

\* cited by examiner

VEHICLE AND CONTROL METHOD THEREOF

CROSS-REFERENCE TO RELATED APPLICATION

This application is based on and claims priority under 35 U.S.C. § 119 to Korean Patent Application No. 10-2020-0064501, filed on May 28, 2020 in the Korean Intellectual Property Office, the disclosure of which is incorporated herein by reference.

TECHNICAL FIELD

The disclosure relates to a personal mobility sharing system and a sharing method of a personal mobility.

BACKGROUND

Recently, as the market for personal mobility corresponding to a single-person mobility means powered by electricity has increased, the number of users using personal mobility on the road has increased.

Generally, in order to use personal mobility, an authentication procedure is performed. For example, the user can unlock the personal mobility by photographing a quick response (QR) code attached to a specific location of personal mobility using a terminal.

However, QR codes attached to personal mobility can be easily damaged. In particular, when attaching a QR code to personal mobility owned by an individual and sharing the personal mobility, there is a high risk of personal mobility loss and damage. Therefore, a more secure authentication method is required to share personal mobility owned by an individual.

SUMMARY

Therefore, it is an aspect of the present disclosure to provide a personal mobility sharing system that may select a sharing member who has permission to use personal mobility and select an unlocking method to be used by the member when sharing personal mobility owned by an individual, and a sharing method of a personal mobility.

In addition, it is another aspect of the present disclosure to provide a personal mobility sharing system that enables setting a sharing time of personal mobility and a use time of a sharing member, and a sharing method of a personal mobility.

In accordance with one aspect of the disclosure, a personal mobility sharing system includes: a personal mobility, a server, an owner terminal and a member terminal connected through a network, and the server is configured to register a device information of the personal mobility, receive a sharing setting information from the owner terminal, set a sharing mode of the personal mobility based on the sharing setting information, receive an authentication request from the member terminal and transmit an unlock signal to the personal mobility when the authentication request includes pre-registered authentication information.

The server may be configured to transmit a member invitation message including the sharing setting information to the member terminal and register unique identification information and authentication information of the member terminal received from the member terminal.

The authentication information may include at least one of facial information, fingerprint information, a personal identification number (PIN) or a one-time password (OTP).

The server may be configured to generate a master identification (ID) based on the device information of the personal mobility and generate a slave ID dependent on the master ID based on the unique identification information of the member terminal.

The server may be configured to set a sharing time of the personal mobility and a use time of the sharing member based on the sharing setting information.

The server may be configured to automatically set the sharing time based on sharing history data of the personal mobility.

The server may be configured to transmit a sharing notification message to the owner terminal before the sharing of the personal mobility starts based on the sharing time.

The server may be configured to transmit a return request message to the member terminal when the use time of the sharing member expires.

The server may be configured to determine an authentication method of the member terminal based on the sharing setting information.

The server may be configured to transmit location information of the personal mobility to the member terminal when the sharing mode of the personal mobility is set.

In accordance with another aspect of the disclosure, a sharing method of a personal mobility is performed by the personal mobility, a server, an owner terminal and a member terminal connected through a network. The method includes: registering a device information of the personal mobility; receiving a sharing setting information from the owner terminal; setting a sharing mode of the personal mobility based on the sharing setting information; receiving an authentication request from the member terminal; and transmitting an unlock signal to the personal mobility when the authentication request includes pre-registered authentication information.

The setting a sharing mode of the personal mobility may include: transmitting a member invitation message including the sharing setting information to the member terminal; and registering unique identification information and authentication information of the member terminal received from the member terminal.

The authentication information may include at least one of facial information, fingerprint information, a personal identification number (PIN) or a one-time password (OTP).

The setting a sharing mode of the personal mobility may include: generating a master identification (ID) based on the device information of the personal mobility; and generating a slave ID dependent on the master ID based on the unique identification information of the member terminal.

The setting a sharing mode of the personal mobility may include: setting a sharing time of the personal mobility and a use time of the sharing member based on the sharing setting information.

The setting a sharing mode of the personal mobility may include: automatically setting the sharing time based on sharing history data of the personal mobility.

The sharing method may further include: transmitting a sharing notification message to the owner terminal before the sharing of the personal mobility starts based on the sharing time.

The sharing method may further include: transmitting a return request message to the member terminal when the use time of the sharing member expires.

The setting a sharing mode of the personal mobility may include: determining an authentication method of the member terminal based on the sharing setting information.

The sharing method may further include: transmitting location information of the personal mobility to the member terminal when the sharing mode of the personal mobility is set.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
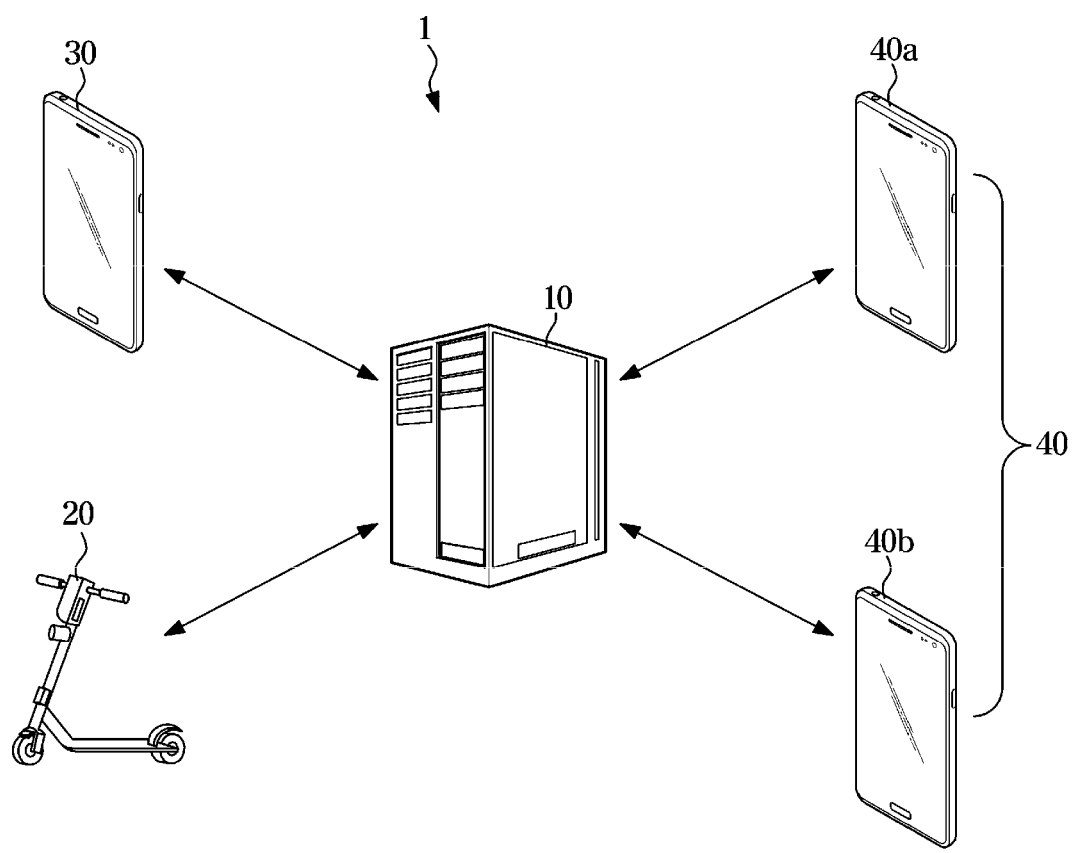
FIG. 1 illustrates a personal mobility sharing system according to an embodiment.

Like reference numerals refer to like elements throughout the specification. Not all elements of embodiments of the disclosure will be described, and description of what are commonly known in the art or what overlap each other in the embodiments will be omitted.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

As used herein, the terms "portion," "unit," "block," "member," and "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

Hereinafter, exemplary embodiments of the present invention will be described in detail with reference to the accompanying drawings.

FIG. 1 illustrates a personal mobility sharing system according to an embodiment.

Referring to FIG. 1, the personal mobility sharing system 1 according to an embodiment may include a server 10, a personal mobility 20, an owner terminal 30 and a member terminal 40. The server 10 corresponds to a computing device. The server 10, the personal mobility 20, the owner terminal 30 and the member terminal 40 can be connected through a network. The server 10 may communicate with the personal mobility 20, the owner terminal 30, and the member terminal 40 using wireless communication and/or wired communication.

Meanwhile, there may be a plurality of members who want to use the shared personal mobility 20, and the member terminal 40 may also be plural. In FIG. 1, a first member terminal 40*a* and a second member terminal 40*b* are illustrated.

Wireless communication may include 5G (5th Generation), LTE, LTE Advance (LTE-A), Code Division Multiple Access (CDMA), Wideband CDMA (WCDMA), Universal Mobile Telecommunications System (UMTS), wireless broadband (WiBro), or Global System for Mobile communications (GSM).

Wired communication may include Universal Serial Bus (USB) communication, High Definition Multimedia Interface (HDMI) communication, Recommended Standard-232 (RS-232) communication, power line communication, or Plain Old Telephone Service (POTS) communication. The network may include a telecommunications network, a computer network (eg, LAN or WAN), the Internet, or a telephone network.

Another name for personal mobility 20 may be an electric kickboard. The personal mobility 30 may include a handle axle, scaffold, handlebar, wheel, radar, front light, audio device and display. In addition, personal mobility 30 may include a rear wheel cover, motor, braking device, suspension, brake lever, pressure sensor, rear light and haptic device. In addition, the personal mobility 20 may include various configurations. The configuration of the personal mobility 20 is described in FIG. 3.

The owner terminal 30 and member terminal 40 may be a mobile terminal or a fixed terminal. Mobile terminals are easy to carry and portable electronic devices, such as video phones, mobile phones, smart phones, WCDMA (Wideband Code Division Multiple Access) terminal devices, UMTS (Universal Mobile Telecommunication Service) terminal devices, Personal Digital Assistant (PDA), Portable Multimedia Player (PMP), Digital Multimedia Broadcasting (DMB) terminal device, E-Book, portable computer (laptop, Tablet, etc.) or a digital camera (Digital Camera). The fixed terminal is an electronic device that may be fixed and used in a specific location, and may include a desktop personal computer, a smart TV, and the like.

Figure 4:
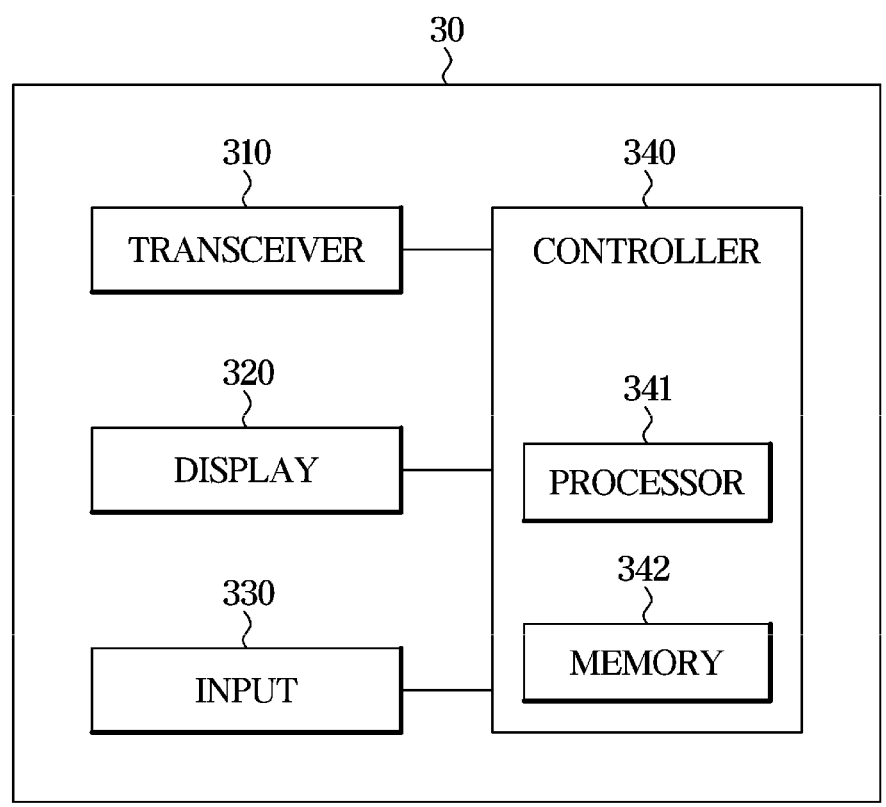
FIG. 4 is a control block diagram of an owner terminal and a member terminal according to an embodiment.

The configuration of the owner terminal 30 and member terminal 40 is described in FIG. 4.

An application and/or program for executing the sharing method of the personal mobility 20 may be installed in each of the server 10, the owner terminal 30, and the member terminal 40.

Figure 2:
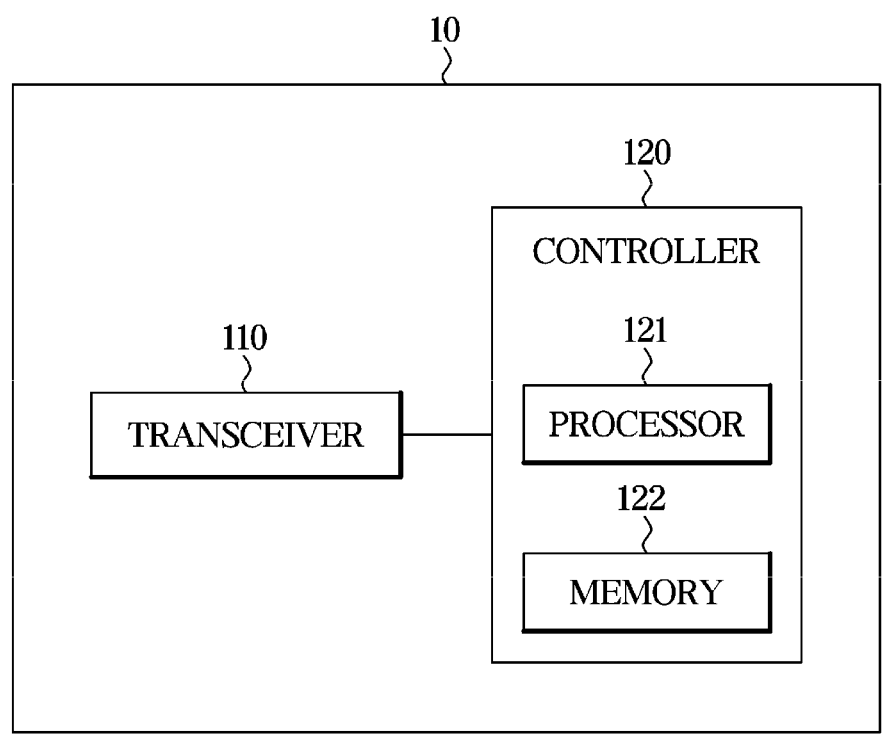
FIG. 2 is a control block diagram of a server according to an embodiment.

FIG. 2 is a control block diagram of a server according to an embodiment.

Referring to FIG. 2, the server 10 may include a transceiver 110 and a controller 120. The transceiver 110 may communicate with the personal mobility 20, the owner terminal 20 and member terminal 40 under the control of the controller 120. The transceiver 110 may include a communication module to which various communication methods described above are applied.

The controller 120 may include a memory 122 in which programs and/or applications related to the sharing of the personal mobility 20 are stored, and a processor 121 executing the programs and/or applications stored in the memory 122. The memory 122 and the processor 121 may be integrated on one chip. Also, the memory 122 and the processor 121 may be provided in physically separate locations. In addition, a plurality of memory 122 and the processor 121 may be provided, respectively.

The memory 122 may include non-volatile memory element such as cache, read only memory (ROM), programmable ROM (PROM), erasable programmable ROM (EPROM), electrically erasable programmable ROM (EEPROM), and flash memory. Further, the memory 122 may include a volatile memory element such as random access memory (RAM), and may include a storage medium such as a hard disk drive (HDD) or a CD-ROM. The type of memory 122 is not limited to that illustrated.

Meanwhile, the personal mobility 20, the owner terminal 30, and the member terminal 40 may also include a transceiver and a controller, respectively.

Figure 3:
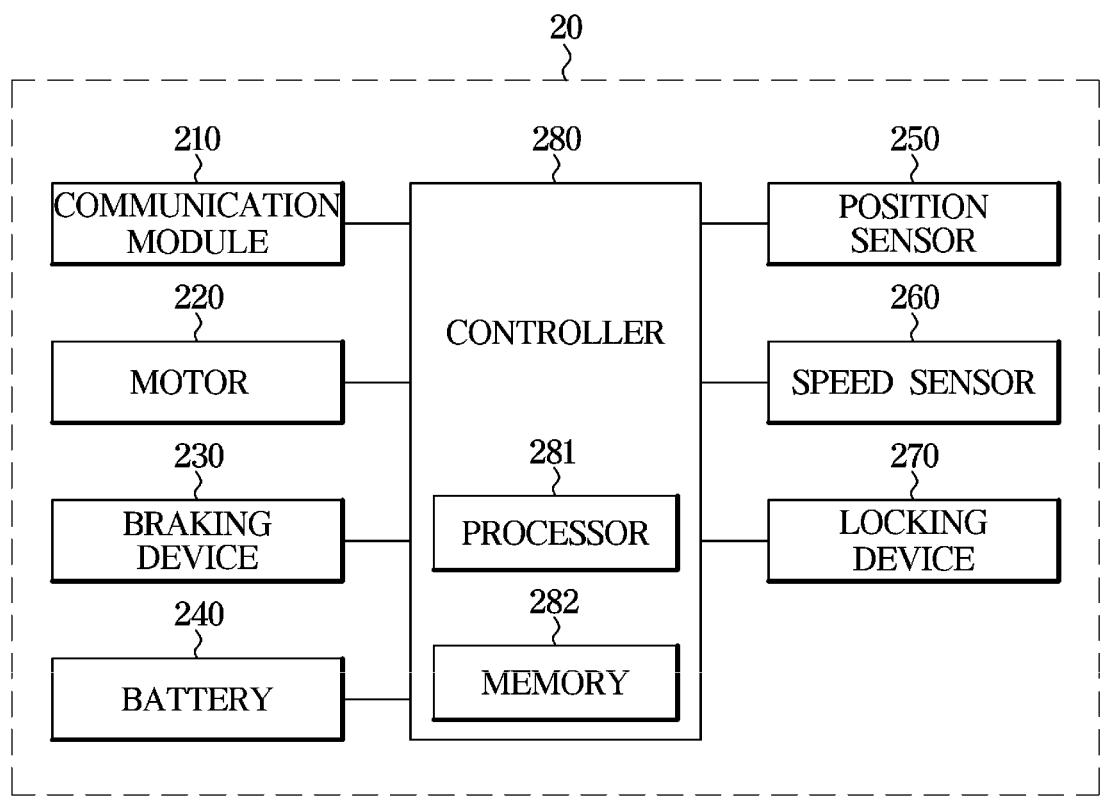
FIG. 3 is a control block diagram of personal mobility according to an embodiment.

FIG. 3 is a control block diagram of personal mobility according to an embodiment.

Referring to FIG. 3, the personal mobility 20 may include a communication module 210, a motor 220, a braking device 230, a battery 240, a position sensor 250, a speed sensor 260, a locking device 270 and a controller 280. The controller 280 is electrically connected to the communication module 210, the motor 220, the braking device 230, the battery 240, the position sensor 250, the speed sensor 260 and the locking device 270, and can control each. The controller 280 may include a control circuit including a processor 281 and a memory 282.

The communication module 210 may perform communication between the personal mobility 20 and external devices. The communication module 210 may communicate with external devices using wireless communication and/or wired communication. As described in FIG. 1, the personal mobility 20 may communicate with the server 10. That is, the personal mobility 20 can be connected to the server 10 through the network. Also, the personal mobility 20 may communicate with an owner terminal 30 or member terminal 40 such as a smartphone.

The communication module 210 may be provided inside the personal mobility 20. Alternatively, the communication module 210 may be a separate external communication device attached to the outside of the personal mobility 20.

The motor 220 is connected to the front wheel, and the front wheel may rotate by driving of the motor 220. The driving shaft of the motor 220 may be provided to match the wheel frame and the rotating shaft of the front wheel. Meanwhile, the position at which the motor 220 is provided may vary. The motor 220 may be provided to rotate the rear wheel, or may be provided to rotate both the front and rear wheels. The motor 220 may be a common brushless direct current motor (BLDC), or may be a driving and regenerative braking type electric motor (e.g., a combined motor and generator).

The braking device 230 may apply a braking force to the wheel. The braking device 230 may operate according to the operation of the brake lever or may operate under the control of the controller 280. The braking device 230 may be a mechanical brake using friction or an electronic brake. The braking device 230 may lower the rotation speed of the front and rear wheels or stop rotation.

The battery 240 provides power for the operation of the personal mobility 20. The controller 280 may obtain state information of the battery 240. The state information of the battery 240 may include the capacity and/or charge amount of the battery 240.

The personal mobility 20 may include various sensors. Sensors may collect device information of personal mobility 30. For example, the personal mobility 20 may include a position sensor 250 to obtain geopolitical location information and a speed sensor 260 to measure the speed. In addition, the personal mobility 20 may include at least one of a pressure sensor that measures the pressure applied to the handlebar, a gyro sensor to measure tilt, or a battery sensor for measuring the battery capacity. The personal mobility 20 may also include other sensors than those described above.

The controller 280 may calculate an average speed based on the speed value obtained from the speed sensor 260. The controller 280 may check the current location based on the location information obtained by the position sensor 250.

The locking device 270 is a device for locking the personal mobility 20 so that the personal mobility 20 does not work without authorization. For example, the locking device 270 may lock the wheel so that the wheel of the personal mobility 20 does not rotate in the locked state. The locking device 270 may block a path of power supplied from the battery 240 to the motor 220 so that the motor 220 cannot be operated in a locked state. The personal mobility 20 may operate normally when the lock by the locking device 270 is released.

FIG. 4 is a control block diagram of an owner terminal and a member terminal according to an embodiment.

Referring to FIG. 4, the owner terminal 30 may include a transceiver 310, a display 320, an input 330 and a controller 340. The member terminal 40 may include the same configuration as the owner terminal 30.

The transceiver 310 may communicate with external devices using wireless communication and/or wired communication. The transceiver 310 may communicate with the server 10 and the personal mobility 20 under the control of the controller 340. The transceiver 310 may include a communication module to which various communication methods described above are applied.

The display 320 may display a user interface. The user interface may be a graphical user interface (GUI). The display 320 may be implemented as a light emitting diode (LED) panel, an organic light emitting diode (OLED) panel, or a liquid crystal display panel. The display 320 may also include a touch panel. The owner terminal 30 and the member terminal 40 may display various information related to the operation of the personal mobility 20.

The input 330 may receive a user input. The user can be an owner or a member. For example, the input 330 may include at least one of a button, a touch pad, or a touch screen. Also, the input 330 may include a fingerprint recognition sensor. The display 320 may include a touch screen. The display 320 including the touch screen may convert a user's touch input into an electrical signal and transmit it to the controller 340. The controller 340 may process an electrical signal according to a user's touch input and execute a function of the owner terminal 30 corresponding thereto.

The controller 340 may include a memory 342 in which programs and/or applications related to the sharing of the owner terminal 30 are stored, and a processor 341 executing the programs and/or applications stored in the memory 342. The memory 342 and the processor 341 may be integrated on one chip. Also, the memory 342 and the processor 341 may be provided in physically separate locations. In addition, a plurality of memory 342 and the processor 341 may be provided, respectively.

The owner terminal 30 and the member terminal 40 may further include a camera. The owner terminal 30 may obtain the owner's facial information based on the owner's facial image photographed by the camera.

Hereinafter, the operation of the personal mobility sharing system 1 according to an embodiment will be described in detail.

Figure 5:
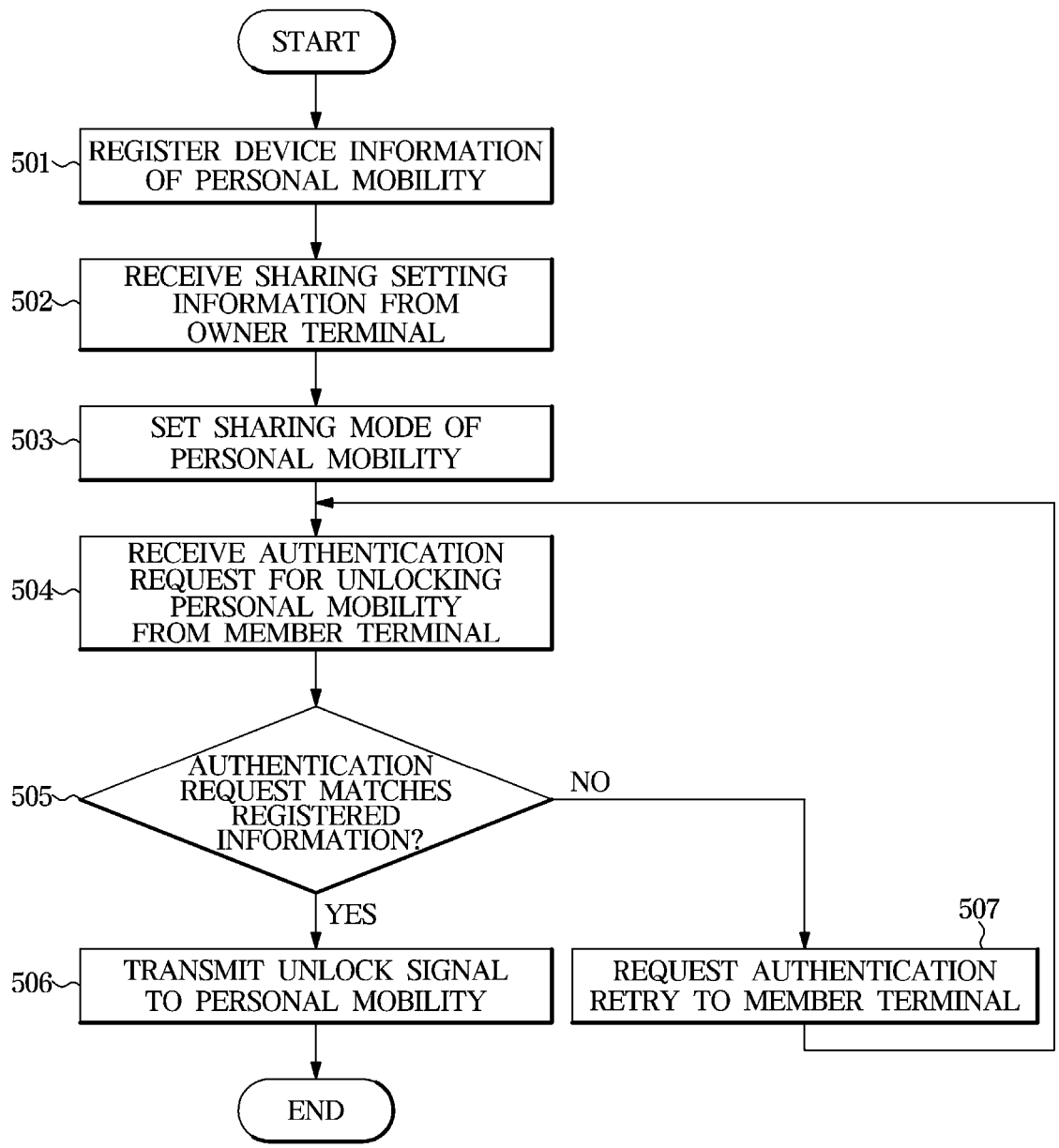
FIGS. 5 and 6 are flowcharts illustrating a sharing method of personal mobility according to an embodiment.
Figure 6:
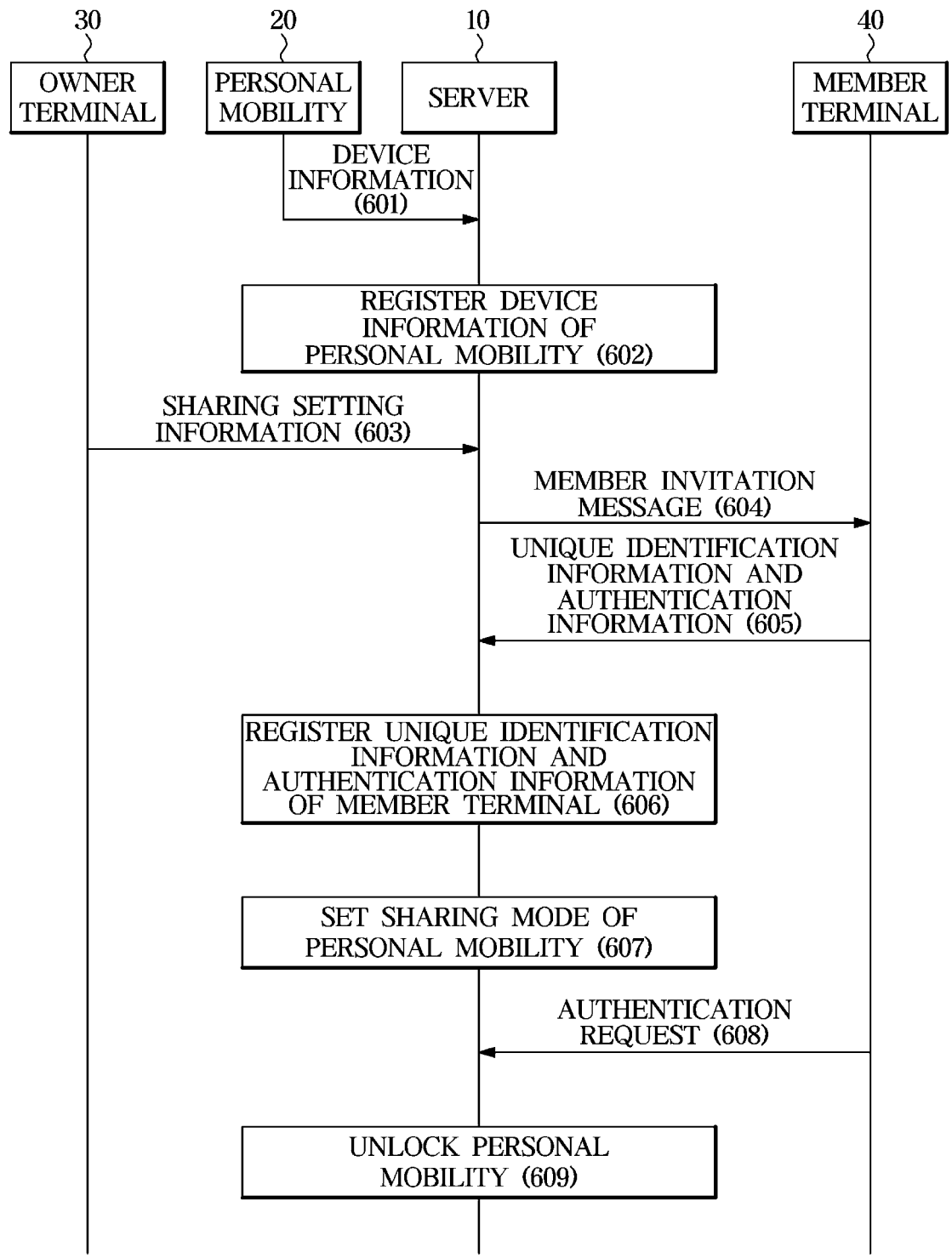

FIGS. 5 and 6 are flowcharts illustrating a sharing method of personal mobility according to an embodiment.

Referring to FIG. 5, the server 10 of the personal mobility system 1 according to an embodiment may register device information of the personal mobility 20 (501). The server 10 may obtain device information from the personal mobility 20. The device information includes a unique number of the personal mobility 20. Also, the device information may include specification information such as the size of the personal mobility 20, driving performance, and battery performance. In addition, device information may include sharing history data of the personal mobility 20.

The unique number of the personal mobility 20 may be predetermined in the manufacture of the personal mobility 20. Alternatively, when a separate external communication device is attached to the personal mobility 20, the unique number may be determined by the external communication device. The server 10 may identify the personal mobility 20 based on the unique number of the personal mobility 20.

The server 10 may receive sharing setting information from the owner terminal 30 (502). The sharing setting information may include whether personal mobility 20 is shared, sharing time, sharing member, use time of sharing member, and authentication method of sharing member. The owner of the personal mobility 20 may use the owner terminal 30 to select a sharing mode or a non-sharing mode as the operating mode of the personal mobility 20. In addition, the owner may designate a sharing time, a sharing member, a use time of the sharing member, and an authentication method of the sharing member using the owner terminal 30. The authentication method may include at least one of face recognition, fingerprint recognition, personal identification number (PIN) input, or one-time password (OTP) input.

The server 10 may set a sharing mode of the personal mobility 20 based on sharing setting information received from the owner terminal 30 (503). That is, the server 10 may activate the sharing mode of the personal mobility 20 based on the sharing time, sharing member, use time of the sharing member, and authentication method of the sharing member included in the sharing setting information.

Meanwhile, the server 10 may automatically set the sharing time based on the sharing history data of the personal mobility 20. When the owner selects the automatic setting mode using the owner terminal 30, the server 10 may automatically set the sharing time. The server 10 may automatically set at least one of the sharing member and the use time of the sharing member or the authentication method of the sharing member based on the sharing history data.

The server 10 may transmit a member invitation message including sharing setting information to the member terminal 40. In addition, the server 10 may register unique identification information and authentication information of the member terminal 40 received from the member terminal 40. The authentication information may include at least one of facial information, fingerprint information, personal identification number (PIN), or one-time password (OTP).

The server 10 may generate a master ID based on device information of personal mobility 20 and a slave ID dependent on the master ID based on unique identification information of member terminal 40. A plurality of slave IDs can be subordinated to the master ID. In other words, when a plurality of sharing members related to personal mobility 20 exist, the plurality of member terminals 40 may be managed as one group.

The server 10 may receive an authentication request for unlocking the personal mobility 20 from the member terminal 40 (504). When the authentication request received from the member terminal 40 includes pre-registered authentication information, the server 10 may transmit an unlock signal to the personal mobility 20 (505, 506). Conversely, when the authentication request received from the member terminal 40 does not include pre-registered authentication information, the server 10 may request authentication retry to the member terminal 40 (507).

As described above, the sharing member can use the personal mobility 20 for a set use time after completing authentication with the designated authentication method.

Referring to FIG. 6, the server 10 may obtain device information from the personal mobility 20 (601) and register device information of the personal mobility 20 (602). Registering device information can be understood as registering personal mobility 20 on a shared platform.

When device information of the personal mobility 20 is registered in the server 10, the owner terminal 30 may transmit sharing setting information to the server 10 (603). The sharing setting information may include whether the personal mobility 20 is shared, sharing time, sharing member, use time of sharing member, and authentication method of sharing member.

Next, the server 10 may transmit a member invitation message including sharing setting information to the member terminal 40 (604). The member terminal 40 may transmit the unique identification information and authentication information of the member terminal 40 to the server 10 in response to the member invitation message (605). The server 10 may register unique identification information and authentication information of the member terminal 40 received from the member terminal 40 (606). The authentication information may include at least one of facial information, fingerprint information, personal identification number (PIN), or one-time password (OTP).

The server 10 may set a sharing mode of the personal mobility 20 based on sharing setting information received from the owner terminal 30 (607). The server 10 may activate the sharing mode of the personal mobility 20 based on the sharing time, sharing member, use time of the sharing member, and authentication method of the sharing member included in the sharing setting information.

The member terminal 40 may transmit an authentication request for unlocking the personal mobility 20 to the server 10 (608). The server 10 may receive an authentication request from the member terminal 40 and unlock the personal mobility 20 (609). When the authentication request received from the member terminal 40 includes pre-registered authentication information, the server 10 may transmit an unlock signal to the personal mobility 20. As the personal mobility 20 is unlocked, the sharing member can use the personal mobility 20.

The authentication request may further include payment information. In other words, the authentication request may include authentication information for personal authentication and payment information for paying a fee for using the personal mobility 20. The sharing member can use the personal mobility 20 after completing authentication and payment of the fee using the member terminal (40).

Meanwhile, it can be understood that the above-described sharing method of personal mobility is performed by the controller 120 of the server 10.

Figure 7:
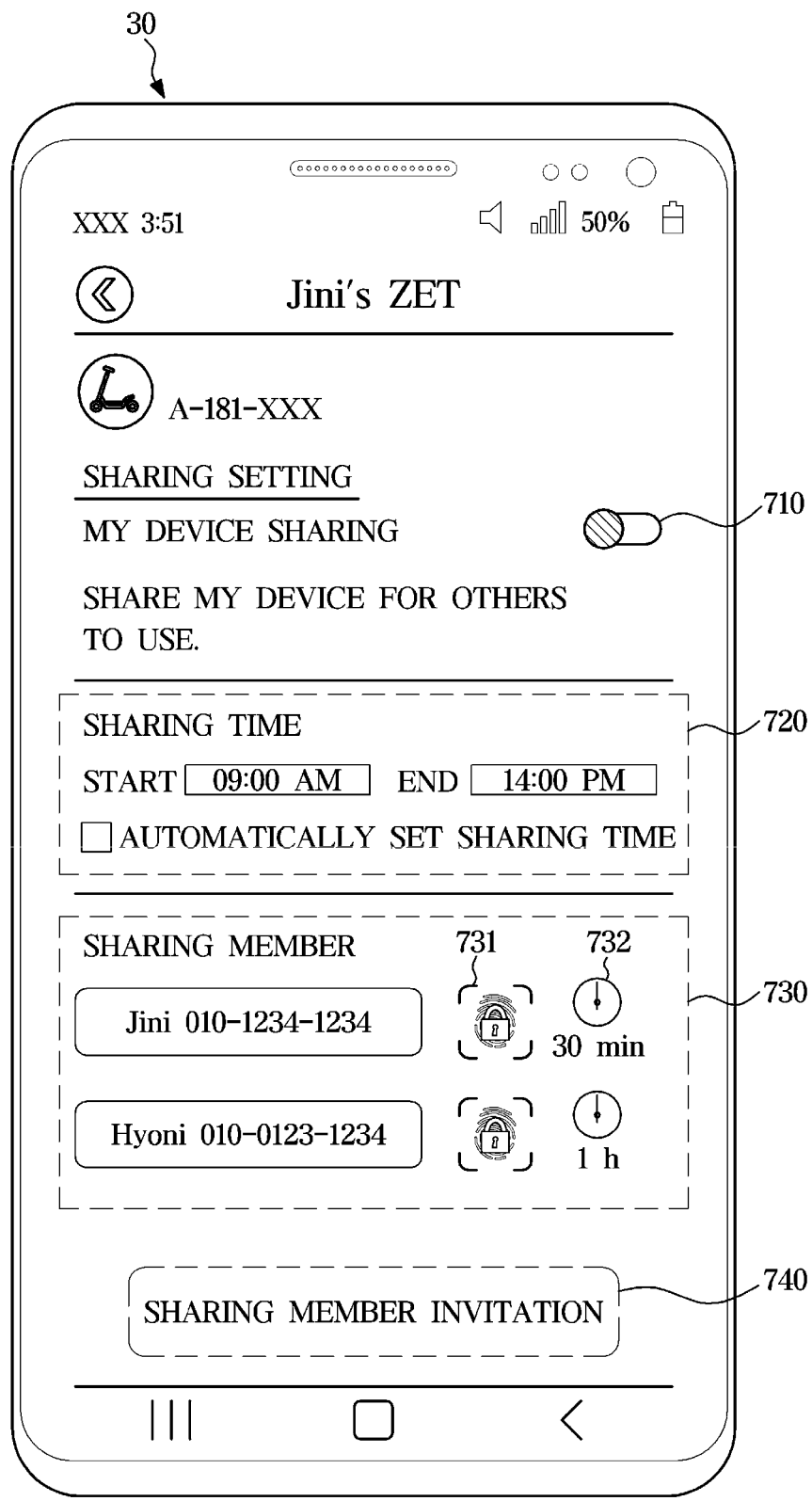
FIG. 7 illustrates an example of a screen displayed on an owner terminal to set a sharing mode.

FIG. 7 illustrates an example of a screen displayed on an owner terminal to set a sharing mode.

Referring to FIG. 7, the owner terminal 30 may display a user interface screen based on execution of an application for sharing the personal mobility 20. The owner can input sharing setting information about the personal mobility 20 using the GUI displayed on the owner terminal 30.

For example, the owner terminal 30 may display a mode selection button 710 for selecting a sharing mode or a non-sharing mode, a sharing time item 720 for inputting a sharing time, a sharing member item 730 for inputting setting information about the sharing member and a transmission command button 740 for inputting a transmission command of a member invitation message. The sharing time item 720 may include a UI element that can select whether to automatically set the sharing time. The sharing member item 730 may include an authentication setting icon 731 for specifying an authentication method of the sharing member and a use time icon 732 for inputting the use time of the sharing member.

In FIG. 7, it is illustrated that the sharing start time is set to 09:00 AM and the sharing end time is set to 14:00 PM. The sharing members selected by the owner are "Jini" and "Hyoni", and it is exemplified that the phone number of each sharing member is displayed. The authentication method of sharing members is set to fingerprint recognition. In addition, the use time of "Jini" among the sharing members is set to 30 minutes, and the use time of "Hyoni" is set to 1 hour.

In addition, when the sharing mode of the personal mobility 20 is set, the server 10 may transmit location information of the personal mobility 20 to the member terminal 40.

Figure 8:
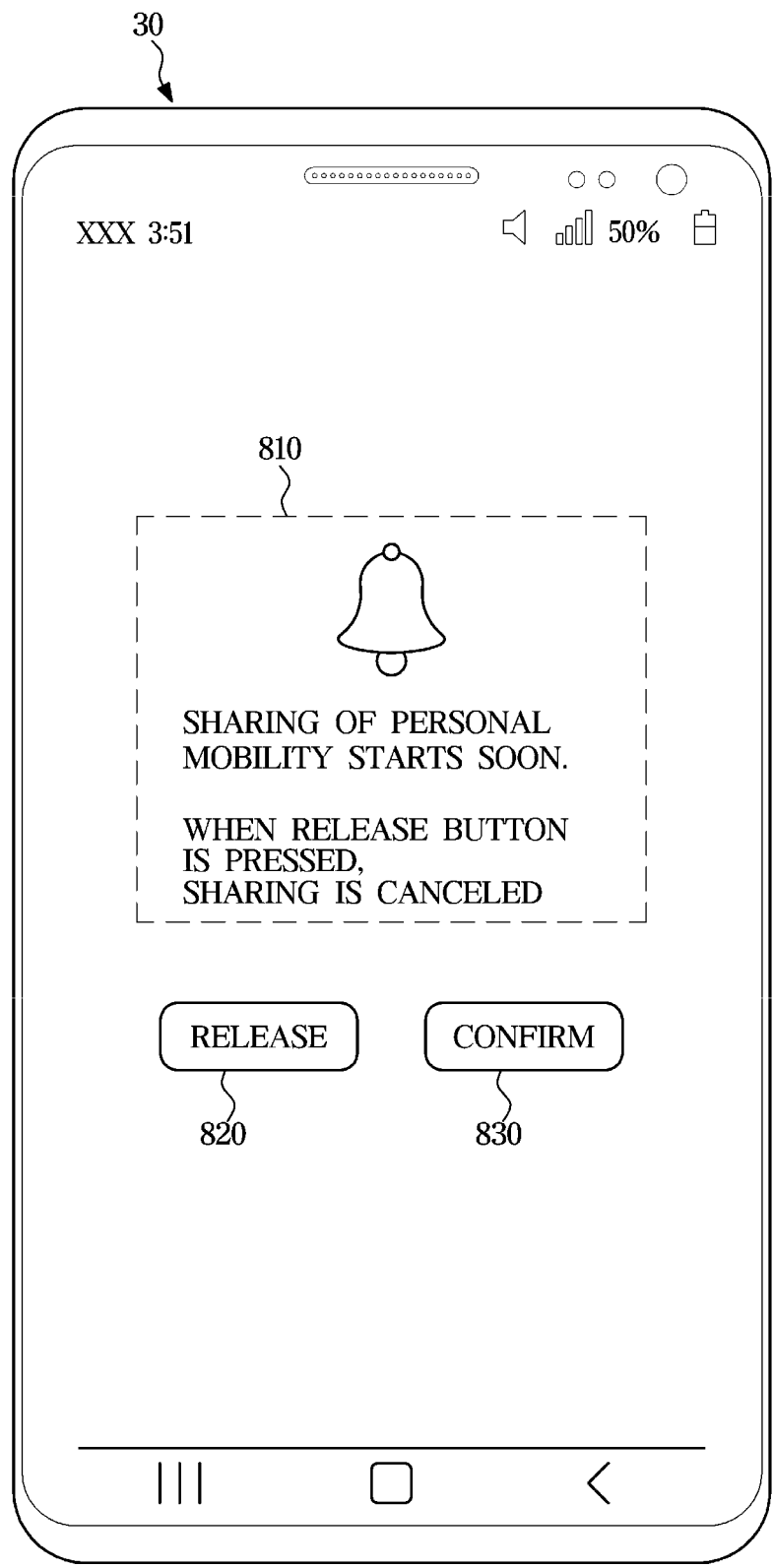
FIG. 8 illustrates an example of a screen displayed on an owner terminal to provide a notification regarding sharing of personal mobility.

FIG. 8 illustrates an example of a screen displayed on an owner terminal to provide a notification regarding sharing of personal mobility.

Referring to FIG. 8, the server 10 may transmit a sharing notification message 810 to the owner terminal 10 before sharing of the personal mobility 20 starts based on the set sharing time. For example, the sharing notification message 810 may be provided as text. In FIG. 8, the sharing notification message 810 is illustrated as "Sharing of personal mobility starts soon. When the release button is pressed, sharing is canceled."

The owner terminal 30 may display a release button 820 and a confirmation button 830 together with a sharing notification message 810. When the owner presses the release button 820, sharing of the personal mobility 20 is canceled. That is, the personal mobility 20 is switched from the sharing mode to the non-sharing mode. When the owner presses the confirm button 830, sharing of the personal mobility 20 is performed at a set time.

Figure 9:
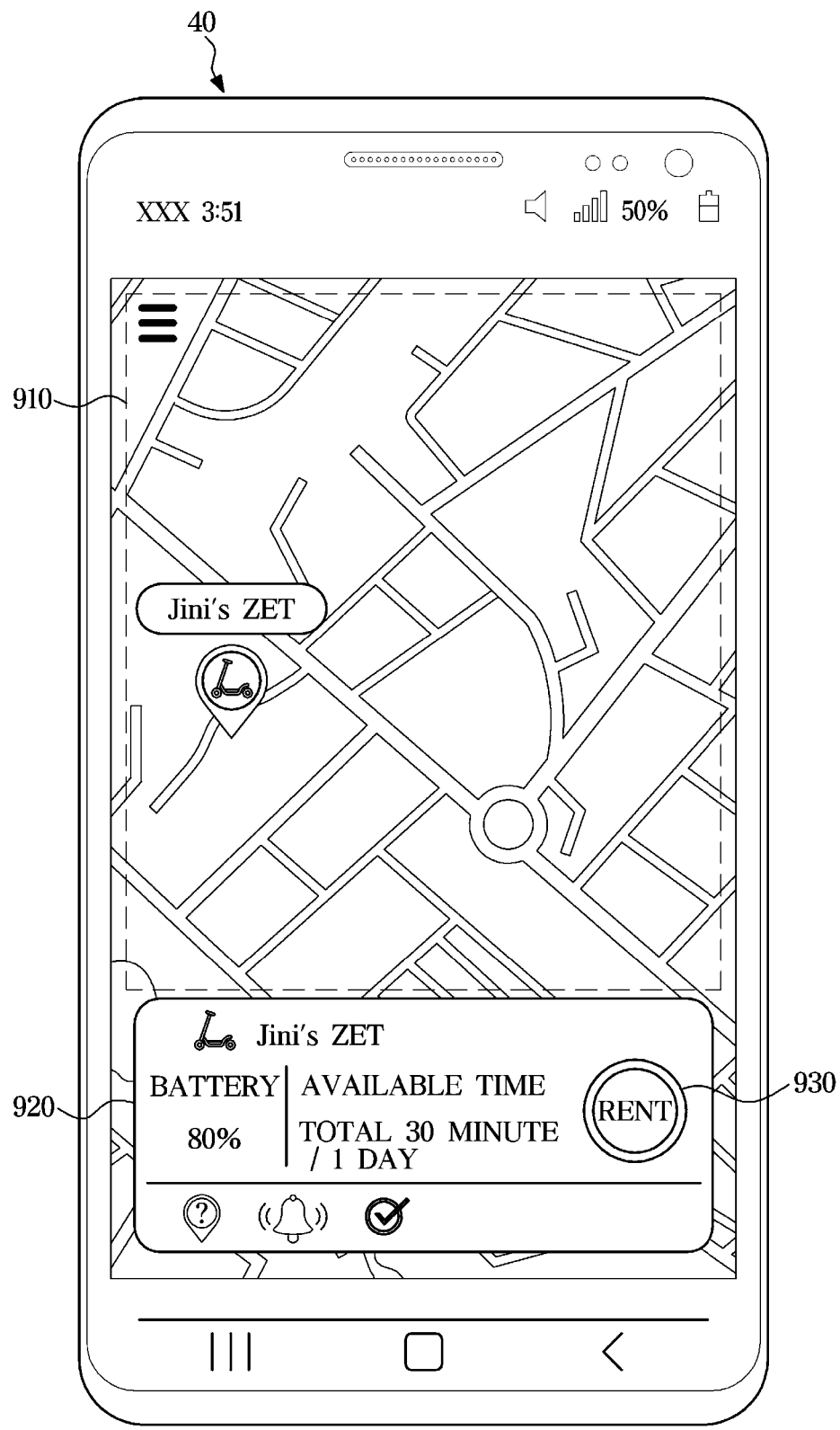
FIGS. 9 and 10 illustrate an example of a screen displayed on a member terminal for an authentication request of a sharing member.
Figure 10:
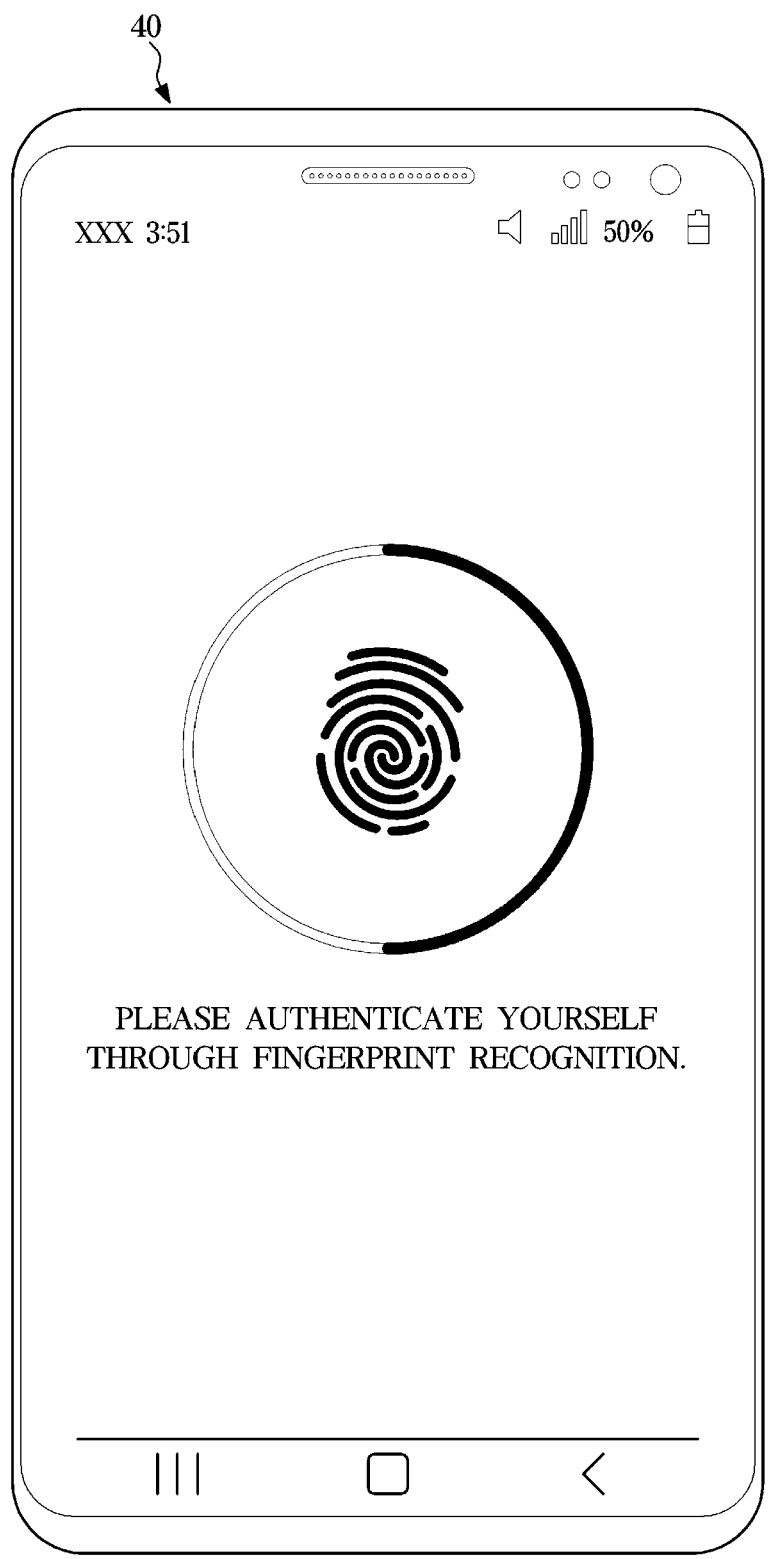

FIGS. 9 and 10 illustrate an example of a screen displayed on a member terminal for an authentication request of a sharing member.

Referring to FIG. 9, when the member terminal 40 executes an application for sharing personal mobility 20, a map 910 indicating the location of personal mobility 20 may be displayed. Also, the member terminal 40 may display the state information box 920 of the personal mobility 20. The state information box 920 may include the battery capacity and available time of the personal mobility 20.

Also, the member terminal 40 may display a rental button 930. When the sharing member presses the rental button 930, an authentication procedure for using the shared personal mobility 20 may be started.

Referring to FIG. 9, when the sharing member presses the rental button 930, the member terminal 40 may display a screen requesting authentication of the sharing member. In FIG. 10, a screen requesting authentication through a fingerprint is illustrated. When fingerprint information is input through the fingerprint recognition sensor provided in the member terminal 40, the member terminal 40 transmits an authentication request including fingerprint information to the server 10. The server 10 determines whether fingerprint information included in the authentication request matches authentication information registered in advance. When the fingerprint information is the same as the pre-registered authentication information, the server 10 transmits an unlock signal to the personal mobility 20.

Figure 11:
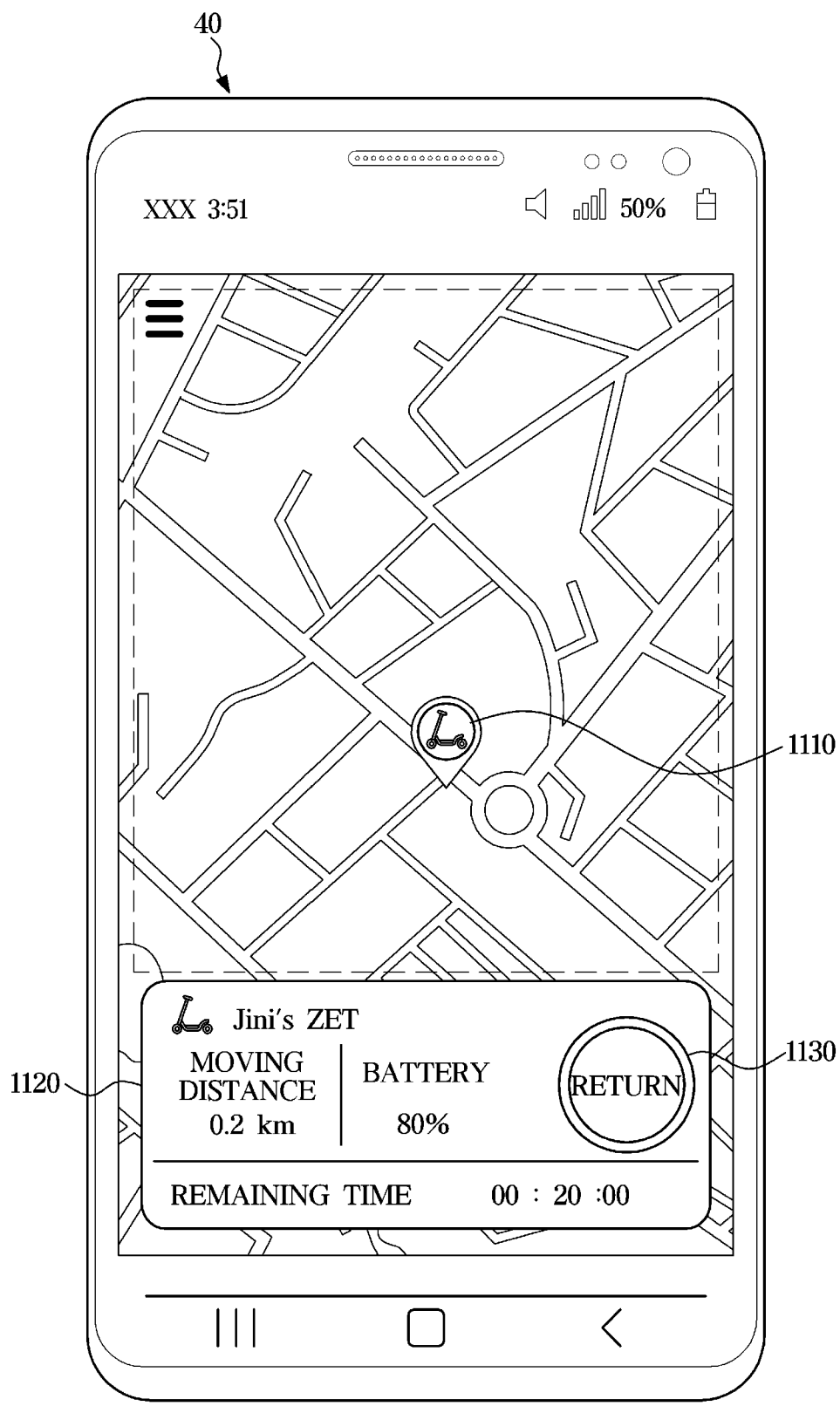
FIG. 11 illustrates an example of a screen displayed on a member terminal while the sharing member uses personal mobility.

FIG. 11 illustrates an example of a screen displayed on a member terminal while the sharing member uses personal mobility.

Referring to FIG. 11, when the use of personal mobility 20 is started after authentication of the sharing member is completed, the member terminal 40 may display a map and use information box 1120 indicating the current location 1110 of the personal mobility 20. The use information box 1120 may include a moving distance, remaining battery capacity, and remaining use time.

In addition, the member terminal 40 may display a return button 1130. When the sharing member presses the return button 1130, the use of the personal mobility 20 may end. The member terminal 40 transmits the return signal to the server 10, and the server 10 receives the return signal and performs the return processing.

Figure 12:
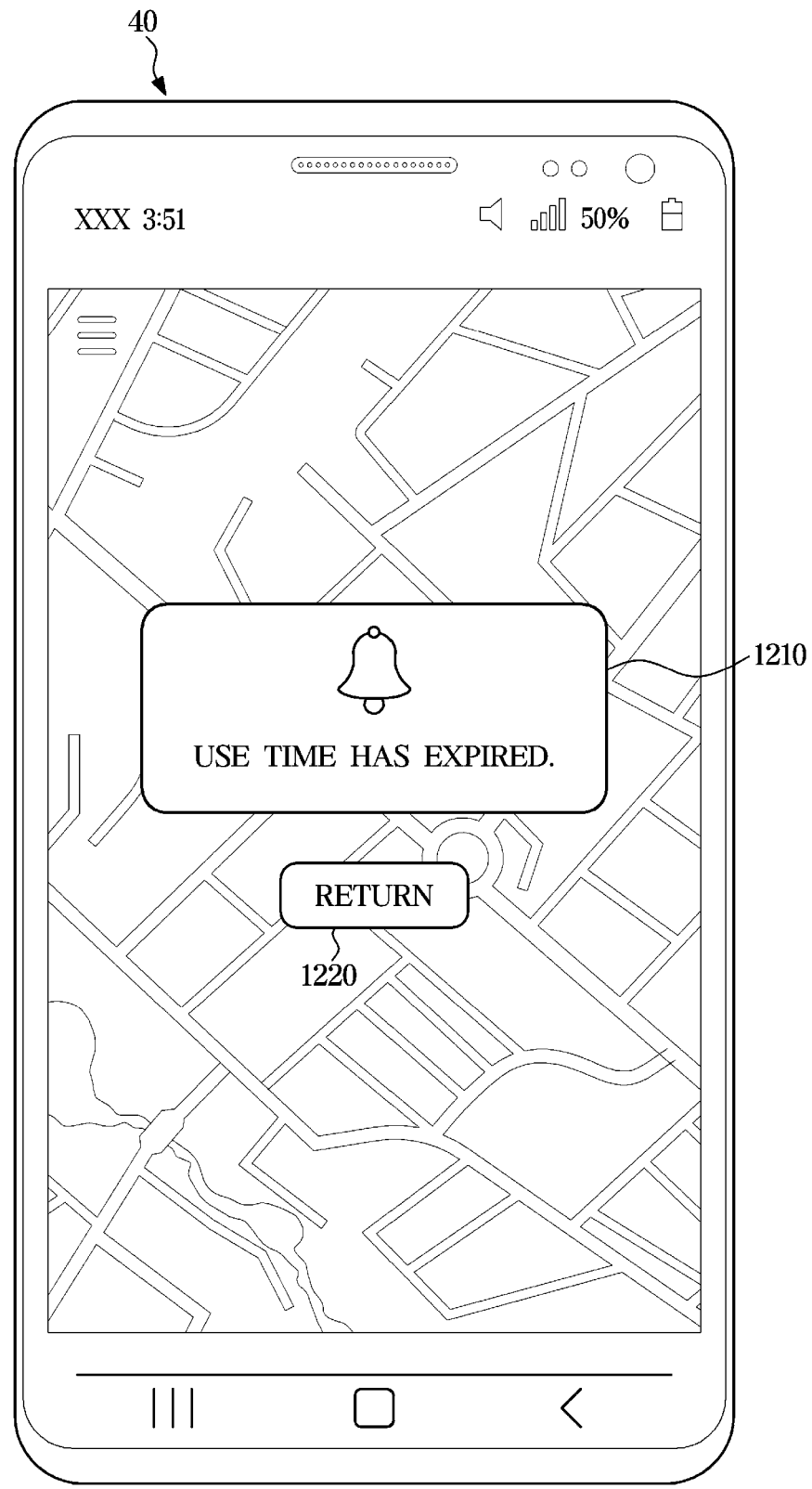
FIG. 12 illustrates an example of a screen displayed on a member terminal in order to provide a notification regarding a use time of a sharing member.

FIG. 12 illustrates an example of a screen displayed on a member terminal in order to provide a notification regarding a use time of a sharing member.

Referring to FIG. 12, when the use time of the sharing member expires, the server 10 may transmit a return request message 1210 to the member terminal 40. The member terminal 40 may receive a return request message 1210 and display a push message and a return button 1220. In FIG. 12, the return request message 1210 is illustrated as being provided as a text message such as "use time has expired.". The sharing member may confirm the end of use of the personal mobility 20 by pressing the return button 1220.

On the other hand, when the use time of the sharing member expires, the server 10 may stop the operation of the personal mobility 20. Alternatively, when the sharing member uses more than the use time, the server 10 may give a penalty to the sharing member. Sharing members who receive a penalty may be restricted in the future use of personal mobility 20.

According to the disclosed personal mobility sharing system and sharing method of personal mobility, the owner of personal mobility can select a sharing member having permission to use personal mobility, and select an unlocking method to be used by the member.

In addition, according to the disclosed personal mobility sharing system and sharing method of personal mobility, the sharing time of personal mobility and the use time of the sharing member can be set. Therefore, the risk of personal mobility being lost or damaged can be reduced.

Meanwhile, the disclosed embodiments may be implemented in the form of a recording medium storing instructions that are executable by a computer. The instructions may be stored in the form of a program code, and when executed by a processor, the instructions may cause the processor to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A personal mobility sharing system comprising:
a personal mobility, a server, an owner terminal and a member terminal connected through a network,
wherein the server is configured to:
register a device information of the personal mobility,
receive a sharing setting information from the owner terminal,
set a sharing mode of the personal mobility based on the sharing setting information,
receive an authentication request from the member terminal,
transmit an unlock signal to the personal mobility when the authentication request comprises pre-registered authentication information,
transmit a member invitation message to the member terminal,
register unique identification information and authentication information of the member terminal received from the member terminal,
generate a master identification (ID) based on the device information of the personal mobility, and
generate a slave ID dependent on the master ID based on the unique identification information of the member terminal.

2. The personal mobility sharing system according to claim 1, wherein
the member invitation message comprises the sharing setting information to the member terminal.

3. The personal mobility sharing system according to claim 1, wherein the authentication information comprises at least one of facial information, fingerprint information, a personal identification number (PIN) or a one-time password (OTP).

4. The personal mobility sharing system according to claim 1, wherein the server is configured to:
set a sharing time of the personal mobility and a use time of the sharing member based on the sharing setting information.

5. The personal mobility sharing system according to claim 4, wherein the server is configured to automatically set the sharing time based on sharing history data of the personal mobility.

6. The personal mobility sharing system according to claim 4, wherein the server is configured to transmit a sharing notification message to the owner terminal before the sharing of the personal mobility starts based on the sharing time.

7. The personal mobility sharing system according to claim 4, wherein the server is configured to transmit a return request message to the member terminal when the use time of the sharing member expires.

8. The personal mobility sharing system according to claim 1, wherein the server is configured to determine an authentication method of the member terminal based on the sharing setting information.

9. The personal mobility sharing system according to claim 1, wherein the server is configured to transmit location information of the personal mobility to the member terminal when the sharing mode of the personal mobility is set.

10. A sharing method of a personal mobility performed by the personal mobility, a server, an owner terminal and a member terminal connected through a network, the method comprises:
registering a device information of the personal mobility;
receiving a sharing setting information from the owner terminal;
setting a sharing mode of the personal mobility based on the sharing setting information;
receiving an authentication request from the member terminal; and
transmitting an unlock signal to the personal mobility when the authentication request comprises pre-registered authentication information;
wherein the setting a sharing mode of the personal mobility comprises:
transmitting a member invitation message to the member terminal;
registering unique identification information and authentication information of the member terminal received from the member terminal;
generating a master identification (ID) based on the device information of the personal mobility; and
generating a slave ID dependent on the master ID based on the unique identification information of the member terminal.

11. The sharing method of the personal mobility according to claim 10, wherein
the member invitation message comprises the sharing setting information.

12. The sharing method of the personal mobility according to claim 10, wherein the authentication information comprises at least one of facial information, fingerprint information, a personal identification number (PIN) or a one-time password (OTP).

13. The sharing method of the personal mobility according to claim 10, wherein the setting a sharing mode of the personal mobility comprises:
setting a sharing time of the personal mobility and a use time of the sharing member based on the sharing setting information.

14. The sharing method of the personal mobility according to claim 13, wherein the setting a sharing mode of the personal mobility comprises:
   automatically setting the sharing time based on sharing history data of the personal mobility.

15. The sharing method of the personal mobility according to claim 13, further comprising:
   transmitting a sharing notification message to the owner terminal before the sharing of the personal mobility starts based on the sharing time.

16. The sharing method of the personal mobility according to claim 13, further comprising:
   transmitting a return request message to the member terminal when the use time of the sharing member expires.

17. The sharing method of the personal mobility according to claim 10, wherein the setting a sharing mode of the personal mobility comprises:
   determining an authentication method of the member terminal based on the sharing setting information.

18. The sharing method of the personal mobility according to claim 10, further comprising:
   transmitting location information of the personal mobility to the member terminal when the sharing mode of the personal mobility is set.

* * * * *